United States Patent
Kafka et al.

(10) Patent No.: US 10,267,985 B2
(45) Date of Patent: Apr. 23, 2019

(54) FIBER DEVICE AND METHOD FOR AMPLIFYING PULSES OF LASER LIGHT

(71) Applicant: Newport Corporation, Irvine, CA (US)

(72) Inventors: James Kafka, Palo Alto, CA (US); Alan Petersen, Palo Alto, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 15/537,739

(22) PCT Filed: Dec. 24, 2015

(86) PCT No.: PCT/US2015/000495
§ 371 (c)(1),
(2) Date: Jun. 19, 2017

(87) PCT Pub. No.: WO2016/105577
PCT Pub. Date: Jun. 30, 2016

(65) Prior Publication Data
US 2018/0039018 A1 Feb. 8, 2018

Related U.S. Application Data

(60) Provisional application No. 62/096,841, filed on Dec. 24, 2014.

(51) Int. Cl.
| | | |
|---|---|---|
| *G02B 6/36* | (2006.01) | |
| *H01S 3/067* | (2006.01) | |
| *G02B 6/00* | (2006.01) | |
| *H01S 3/16* | (2006.01) | |
| *H01S 3/08* | (2006.01) | |

(Continued)

(52) U.S. Cl.
CPC ............. *G02B 6/036* (2013.01); *G02B 6/00* (2013.01); *H01S 3/06716* (2013.01); *H01S 3/06733* (2013.01); *H01S 3/06754* (2013.01); *H01S 3/08045* (2013.01); *H01S 3/1631* (2013.01); *H01S 3/042* (2013.01); *H01S 3/06704* (2013.01); *H01S 3/094007* (2013.01); *H01S 3/164* (2013.01); *H01S 3/165* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,313,312 B2 * | 12/2007 | Kimball | ............ | C03B 37/01413 385/123 |
| 2002/0126974 A1 | 9/2002 | Bayart et al. | | |

(Continued)

OTHER PUBLICATIONS

Towata et al., Preparation of polycrystalline YAG/alumina composite fibers and YAG fiber by sol-gel method, May 26, 2000, Composites: Part A, vol. 32, pp. 1127-1131.*
(Continued)

*Primary Examiner* — Thomas A Hollweg
*Assistant Examiner* — Eric D Chiem
(74) *Attorney, Agent, or Firm* — Brian F. Swienton; Edward Scott Trask

(57) ABSTRACT

The present application discloses a double-clad crystal fiber which includes a Yb-doped CALGO core region, a pump cladding region configured to have the core region positioned therein, and a second cladding region configured to have the core region and pump cladding region positioned therein.

20 Claims, 5 Drawing Sheets

(51) Int. Cl.
    *H01S 3/042*     (2006.01)
    *H01S 3/094*     (2006.01)
    *G02B 6/036*     (2006.01)

(52) U.S. Cl.
    CPC ........... *H01S 3/1618* (2013.01); *H01S 3/1638* (2013.01); *H01S 3/1648* (2013.01)

(56) References Cited

U.S. PATENT DOCUMENTS

| | | | |
|---|---|---|---|
| 2006/0110122 A1 | 5/2006 | Huang et al. | |
| 2006/0120678 A1 | 6/2006 | Manyam et al. | |
| 2013/0344277 A1* | 12/2013 | Kolis | H01S 3/0612 428/64.1 |
| 2014/0055841 A1 | 2/2014 | Cormier et al. | |
| 2014/0079363 A1* | 3/2014 | Hsu | G02B 6/036 385/127 |
| 2014/0316388 A1* | 10/2014 | Hipsley | A61F 9/00802 606/4 |

OTHER PUBLICATIONS

Harrington, James, "Single-Crystal fiber optics: a review," Proc. SPIE 8959, Solid State Lasers XXIII: Technology and Devices, 895902 (Feb. 28, 2014).*

Harrington "Single-crystal fiber optics: a review," Proceedings of SPIE vol. 8959 895902-9 (2014).

Soleimani, et al., "Coilable Single Crystals Fibers of Doped-YAG for High Power Laser Applications," Proceedings of SPIE vol. 8959 895903-10 (2014).

Mu, et al., "Double Clad YAG Crystalline Fiber Waveguides for Diode Pumped High Power Lasing," Proceedings of SPIE vol. 8959 895905-9 (2014).

Lo, et al., "Double-clad Cr4+:YAG crystal fiber amplifier," Optics Letters, vol. 30, No. 2 (Jan. 2005).

Dubinskiy, et al., "Coilable Crystalline Fiber (CCF) Lasers and their Scalability," ARL-TR-6850 (Mar. 2014).

* cited by examiner

Fig. 2 *Prior Art*

FIBER DEVICE AND METHOD FOR AMPLIFYING PULSES OF LASER LIGHT

CROSS REFERENCE TO RELATED APPLICATIONS

The present application claims priority to Patent Cooperation Treaty Patent Application No. PCT/US2015/000495, entitled "Fiber Device and Method for Amplifying Pulses of Laser Light," filed on Dec. 24, 2015, which claims priority to U.S. Provisional Patent Appl. No. 62/096,841, entitled "Fiber Device and Method for Amplifying Pulses of Laser Light," filed on Dec. 24, 2014, the contents of both of which are hereby incorporated by reference in their entirety herein.

BACKGROUND

Optical fibers are presently used in a vast array of applications. As shown in FIG. 1, typical optical fibers 1 include a body 3 formed from a core region 5 formed from of higher index of refraction material surrounded by at least one cladding region or layer 7 manufactured from a material having a lower index of refraction relative to the core region 5. For example, optical fibers having two (2) or more cladding regions have been manufactured. Typically, the core region 5 and cladding region 7 of the optical fiber are manufactured from silica or glass materials. Optionally, a protective coating or material 9 may be applied to the exterior surface of the cladding 7. Light of a sufficiently low numerical aperture that is introduced into the end of the optical fiber is then guided through the fiber.

In some applications, it may be desirable to add one or more dopants to the core region, the cladding regions, or both. For example, FIG. 2 shows an embodiment of a double-clad doped optical fiber 11 having a body 13 formed from a core 15 positioned within a first cladding region or pump cladding region 17, which is located within a second cladding region 19. Optionally, a protective coating or material 21 may be applied to the exterior surface of the second cladding region 19.

In some applications, the core region 15 may be doped with one or more optically active rare-earth ions to form fiber lasers and/or fiber amplifiers. Doped double-clad fibers as described above may be extremely useful for amplifying pulses. Exemplary pulses include, without limitations, those having pulse durations ranging from nanosecond durations to femtosecond durations. In some applications, the core region 15 may be small enough and the numerical aperture (hereinafter NA) of the core region 15 low enough to permit the core region 15 to support only a single spatial mode.

It is often desirable to manufacture an optical fiber 11 having a larger core region 15 to minimize the nonlinear effects of the signal in the core region 15. Nonlinear effects can include self phase modulation, stimulated Raman scattering stimulated Brillouin scattering and four wave mixing. In these optical fibers, known as large mode area fibers (hereinafter LMA fibers), the lowest NA that can be manufactured repeatedly using conventional fiber drawing methods is about 0.060. As such, the largest single mode core region 15 is about 30 µm in diameter. The pump cladding region 17 is typically about 250 µm in diameter and has a much larger NA of 0.46. The larger diameter of the pump cladding region 17 and NA is needed to capture the pump light emitted by a pump source (not shown) in optical communication with the optical fiber 11. Often, laser diodes, which tend to output highly divergent, multimode pump beams, are used as pump sources.

Typically, to minimize nonlinear effects, a short length (about 1 or a few meters) of doped double-clad optical fiber is used to form a fiber amplifier. However, it is also desirable to absorb all or at least most of the pump signal to increase efficiency. The effective absorption of the pump signal is determined by the doping level in the core region 15 and the ratio of the size of the pump cladding region 17 to the core. Since the pump cladding region is undoped, the pump signal is typically only absorbed when the pump signal encounters the core region 15 and thus the effective value of the absorption is decreased by the cladding to core area ratio.

Typically, for these LMA fibers, the maximum doping level is often limited due to photodarkening, which leads to power degradation over time in highly doped (and thus highly excited) fibers. In combination with the typical cladding to core ratio of 8:1, a typical fiber length to absorb the pump is approximately 2 meters.

Recently, some fiber amplifier manufacturers have developed doped double-clad rod-type fiber devices in an effort to minimize the nonlinear effects associated with conventional doped double-clad fibers. For example, NKT Photonics has developed a rod-type doped double-clad fiber offering reduced nonlinearity. Different manufacturing processes are employed to manufacture these rod-type devices. As a result, the NA of these rod-type device can be as low as 0.02 and single mode cores of 85 µm or 100 µm can be manufactured. In addition, by using a web of air holes formed around the pump cladding, rod-type fibers having a cladding NA of 0.6 are presently available. Unfortunately, a number of shortcomings of rod-type fiber device have been identified. For example, the cladding to core ratio of rod-type fiber architectures is limited by the need to use small air holes for guiding the light in the core. For example, an 85 µm core may be manufactured with a 200 µm pump cladding. In another example, a 100 µm core may include a 285 µm cladding. As such, the smallest cladding to core ratio rod-type fiber devices is about 2.35. As a result, the typical length of the rod-type device needed to absorb the pump light is 0.5 to 1 meter. Due to the low NA, rod-type doped double-clad fiber devices typically cannot be bent without causing significant bending losses to the signal traversing through the fiber device.

In light of the foregoing, there is an ongoing need for a double-clad optical fiber having a large core with a low NA that supports only a single mode or, in the alternative, that supports only a few modes. Furthermore, such a fiber that can efficiently absorb the pump beam in a short length is desired.

SUMMARY

The present application is directed to a fiber device and method for amplifying pulses of laser light. More specifically, the present application discloses a double-clad crystal fiber which includes a core region manufactured from a non-glass material, a pump cladding region configured to have the core region positioned therein, and a second cladding region configured to have the core region and pump cladding region positioned therein.

In another embodiment, the present application discloses a double-clad crystal fiber which includes a Yb-doped CALGO core region, a pump cladding region configured to have the core region positioned therein, and a second cladding region configured to have the core region and pump cladding region positioned therein.

In addition, the present application discloses a method of manufacturing a double-clad crystal fiber, and includes forming a core region manufactured from at least one non-glass material, forming a pump cladding region proximate to the core region wherein the pump cladding region includes the core region therein, and forming at least a second cladding region proximate to the pump region wherein the second cladding region includes the core region and pump cladding region positioned therein.

Other features and advantages of the embodiments of the various fiber devices and methods for amplifying pulses of laser light as disclosed herein will become apparent from a consideration of the following detailed description

BRIEF DESCRIPTION OF THE DRAWINGS

Various embodiments of a fiber device and method for amplifying pulses of laser light will be explained in more detail by way of the accompanying drawings, wherein.

DESCRIPTION

The present application discloses various embodiments of devices and methods for amplifying ultrafast pulses of laser light using a novel optical fiber architecture. In one embodiment, the present application discloses an embodiment of a double-clad optical fiber configured to support a single mode. In the alternative, the present application discloses an embodiment of a double-clad optical fiber configured to support a few modes. By adjusting the launch conditions of the optical signal introduced into the optical fiber and controlling the bending of the fiber, only one spatial mode of the fiber is excited and the fiber is referred to as effectively single mode. Further, the present application discloses a double-clad optical fiber having a large thermal conductivity relative to presently available optical fibers thereby enabling excess heat to be efficiently removed from the optical fiber. In another embodiment, the present application discloses a double-clad optical fiber having a highly doped core region configured to absorb the incident pump light in a shorter length than presently available optical fibers without photodarkening.

Figure 1:
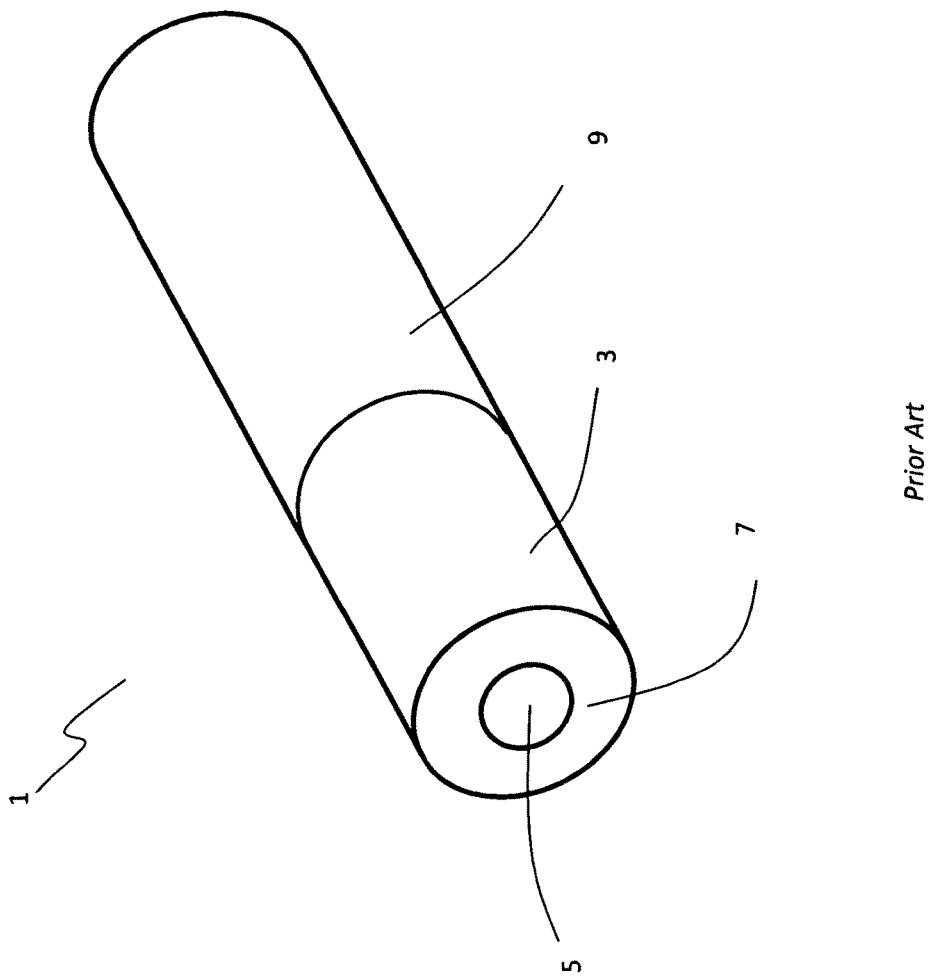
FIG. 1 shows an elevated perspective view of an example of a prior art optical fiber which includes an optical fiber having a body formed from a core region positioned within a cladding region.
Figure 2:
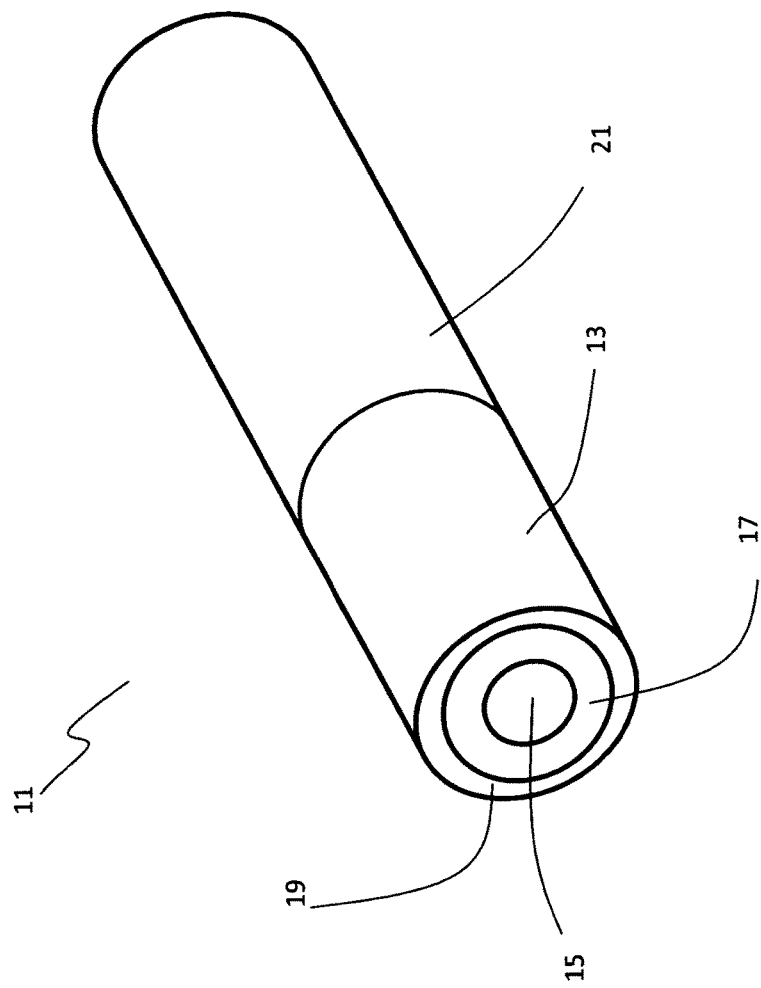
FIG. 2 shows an elevated perspective view of another example of a prior art optical fiber which includes an optical fiber having a body formed within a first core region, the first core region positioned within a second core region.
Figure 3:
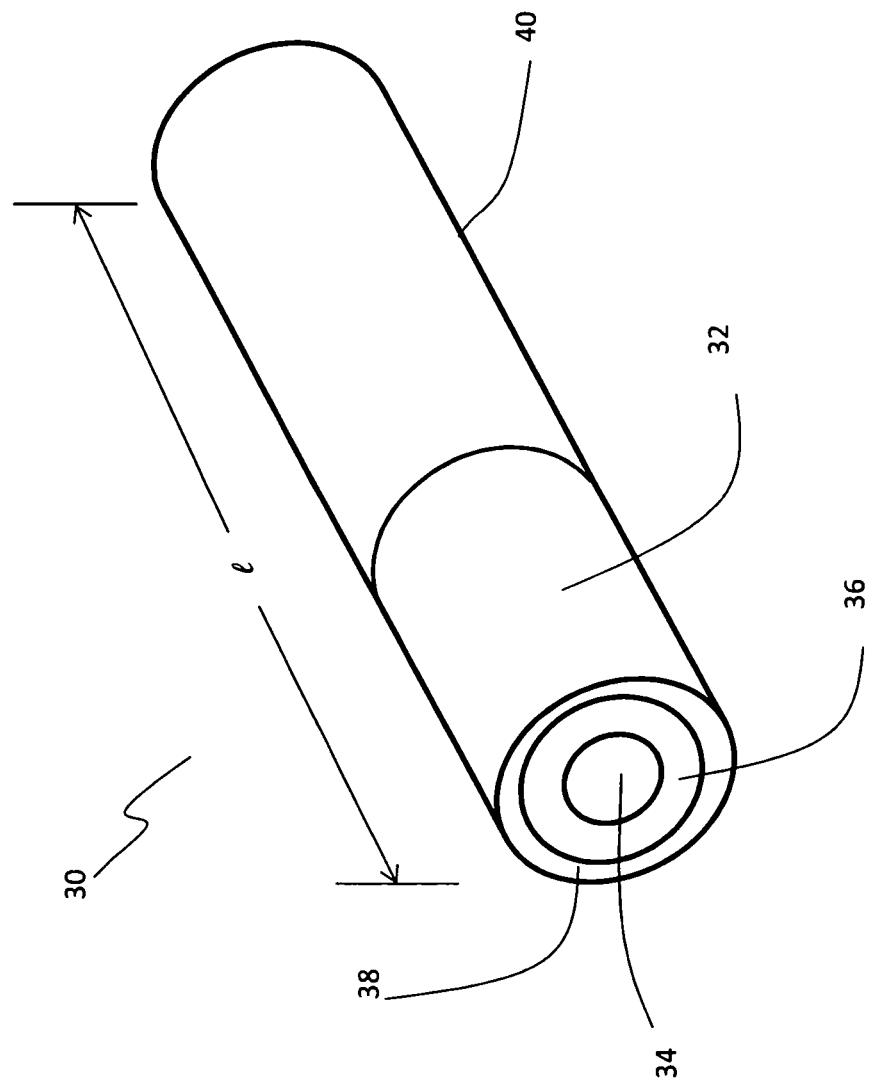
FIG. 3 shows an elevated perspective view of an optical fiber for amplifying ultrafast pulses of laser light which includes an optical fiber having a body formed within a first core region, the first core region positioned within a second core region.

FIG. 3 shows an embodiment of an optical fiber for amplifying ultrafast pulses of laser light. In one embodiment, the double-clad optical fiber shown in FIG. 3 may be manufactured from at least one crystalline and/or polycrystalline material, instead of glass, is described and results in a gain media or amplifier with reduced nonlinear effects. As shown in FIG. 3, the optical fiber 30 comprises a fiber body 32 having at least one doped core region 34 positioned therein. In one embodiment, the core region 34 has a transverse dimension of about 5 µm to about 100 µm. In another embodiment, the core region 34 has a transverse dimension of about 10 µm to about 40 µm. In yet another embodiment, the core region 34 has a transverse dimension of about 30 µm to about 50 µm. Optionally, the core region 34 may have a transverse dimension of about 40 µm.

Referring again to FIG. 3, in one embodiment, a highly doped core region 34 may be manufactured from Yb-doped CALGO. Those skilled in the art will appreciate that additional materials may be used to dope the core region 34, including, without limitations, Nd, Er, Pr, Ti, Ho, Tm and Cr and the core can be made from materials including YAG, sapphire and calcium fluoride. As such, the doped core region 34 may be manufactured using any variety of manufacturing techniques. For example, in one embodiment, the core region 34 may be manufactured using a laser heated pedestal growth (LHPG) technique, such as the technique practiced by Shasta Crystals. In the alternative, the doped core region 34 may be manufactured using a micro-pulling down technique practiced by FiberCryst. In addition, these crystalline core regions 34 may be highly doped without suffering from photodarkening associated with glass-based doped optical fibers.

Referring again to FIG. 3, at least a first cladding or pump cladding region 36 is positioned within the body 32 and configured to envelop the core region 34 therein. A variety of materials may be used to form the pump cladding region 36, including, without limitations, CALGO, YAG, alumina (sapphire), calcium fluoride, polyimide and silica. In one embodiment, the pump cladding region 36 may be applied using a sol-gel process in which the core region 34 is dipped or otherwise positioned within viscous pump cladding materials. Thereafter, the dipped core region 34 having the pump cladding material 36 thereon is dried and/or baked, thereby producing at least one polycrystalline pump cladding region 36 which surrounds the core region 34. Multiple applications of the pump cladding-forming sol-gel process may be used to form at least one pump cladding region 36 of a desired thickness. For example, in one embodiment, the pump cladding region 36 may have a thickness of about 1 µm to about 50 µm. In another embodiment, the pump cladding region 36 may have a thickness of about 1 µm to about 15 µm. Optionally, the pump cladding region 36 may have a thickness of about 5 µm to about 10 µm, much less than the thickness required for signal guidance in prior art rod-type glass fibers. As such, the core region 34 and pump cladding region 36 can have very repeatable indices and cladding to core ratios can be much less than 2. As such, a low core NA of 0.02 or less can be manufactured. Further, the optical fiber architecture described herein has a small pump cladding region 36 with a high NA that can capture the pump light from a multi-mode diode efficiently.

Further, at least a second cladding region 38 is positioned within the body 32 and configured to envelop the core region 34 and the pump cladding region 36 therein. For example, a low index second cladding region 38 may then be applied using an additional sol-gel process or other application methods known in the art. Any variety of materials may be used to form the second cladding region 38, including, without limitations, polyimide, silica, YAG, alumina, and the like. Optionally, the NA of the pump cladding can be very high relative to prior art LMA fiber systems. The combination of a highly doped core and the small pump cladding region 36 to core region 34 ratio allows for the manufacture of a device offering improved performance, with a shorter length E and thus with fewer nonlinear effects as compared to prior art devices. The ability to remove residual heat from the fiber can be superior to the rod-type glass fibers as there is no air web required to get the high NA for the pump cladding and crystalline materials typically have a much higher thermal conductivity than glass.

In the illustrated embodiment, at least one protective material 40 is applied to an exterior surface of the body 32 of the optical fiber 30. Those skilled in the art will appreciate the doped double-clad optical fiber 30 may be manufactured without the protective material 40 applied to an exterior surface of the body 32 of the optical fiber 30.

Figure 4:
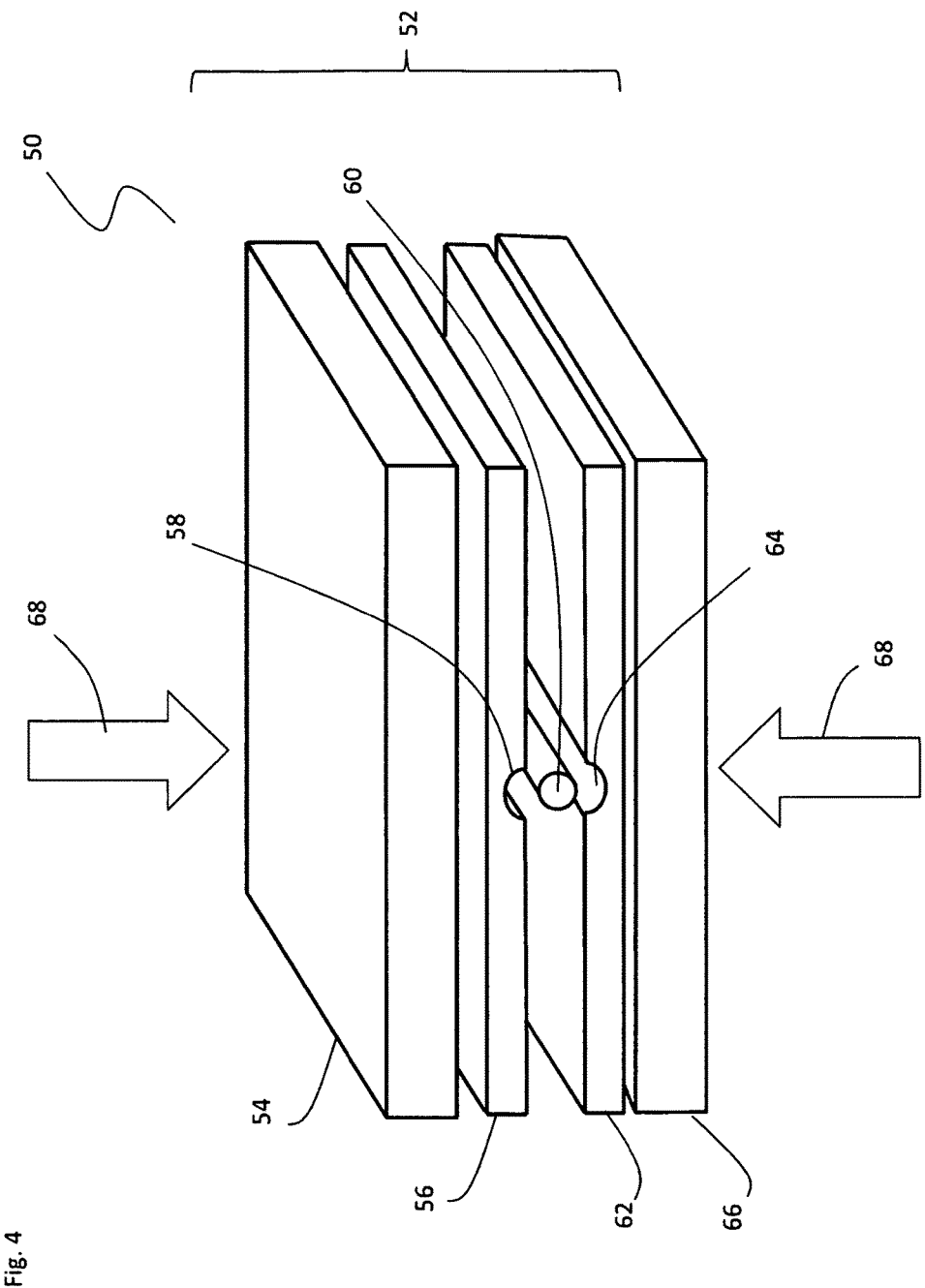
FIG. 4 shows an embodiment of a fiber clamping device used in securely positioning an embodiment of the fiber device disclosed therein.

In one embodiment, in order to facilitate single mode signal propagation in the fiber as well as efficient waste heat removal, the fiber may be held substantially straight within or supported by a thermally conductive structure. For example, in one embodiment, at least a portion of the fiber may be positioned within portions of a tight-fitting, preformed cylindrical channel. Optionally, the cylindrical channel may be made from at least one soft metal foil. Further, the fiber may be clamped in place within a conductive heat sink. FIG. 4 shows an embodiment of such a fiber clamping device supporting a fiber therein. As shown, the fiber clamping device 50 includes at least one clamp device body 52 formed from a first clamp device member 54 and at least a second clamp device member 66. In one embodiment at least one of the first and second clamp device members 54, 66 is constructed from or which includes at least one highly thermally conductive material therein. Exemplary thermally conductive materials include, without limitations, Copper, Aluminum, Tungsten, and other known highly thermally conductive materials, metals, and/or alloys.

Referring again to FIG. 4, the fiber clamping device 50 may further include at least one fiber engaging member channel. In the illustrated embodiment, a fiber engaging channel is cooperatively formed within one or more thermally conductive foils or compliant bodies. As shown in FIG. 4, a first foil body 56 having at least one fiber channel 58 formed therein and a second foil body 62 having at least one fiber channel 64 formed therein may be used to securely engage and position the fiber 60 within the fiber clamping device 50. In one embodiment, at least one of the first and second foil bodies 56, 62 may be manufactured from a material having high thermal conductivity, mechanical compliance and melting point. Exemplary materials include, without limitations, Aluminum, Copper, Gold, Silver, Indium, Tin, Lead, soft brazing alloys such as produced by Indium Corporation of America and other materials known in the art. During, use, one or more clamping forces 68 may be applied to at least a portion of the fiber clamping device 52 thereby securely retaining and positioning at least one fiber 50 therein.

Figure 5:
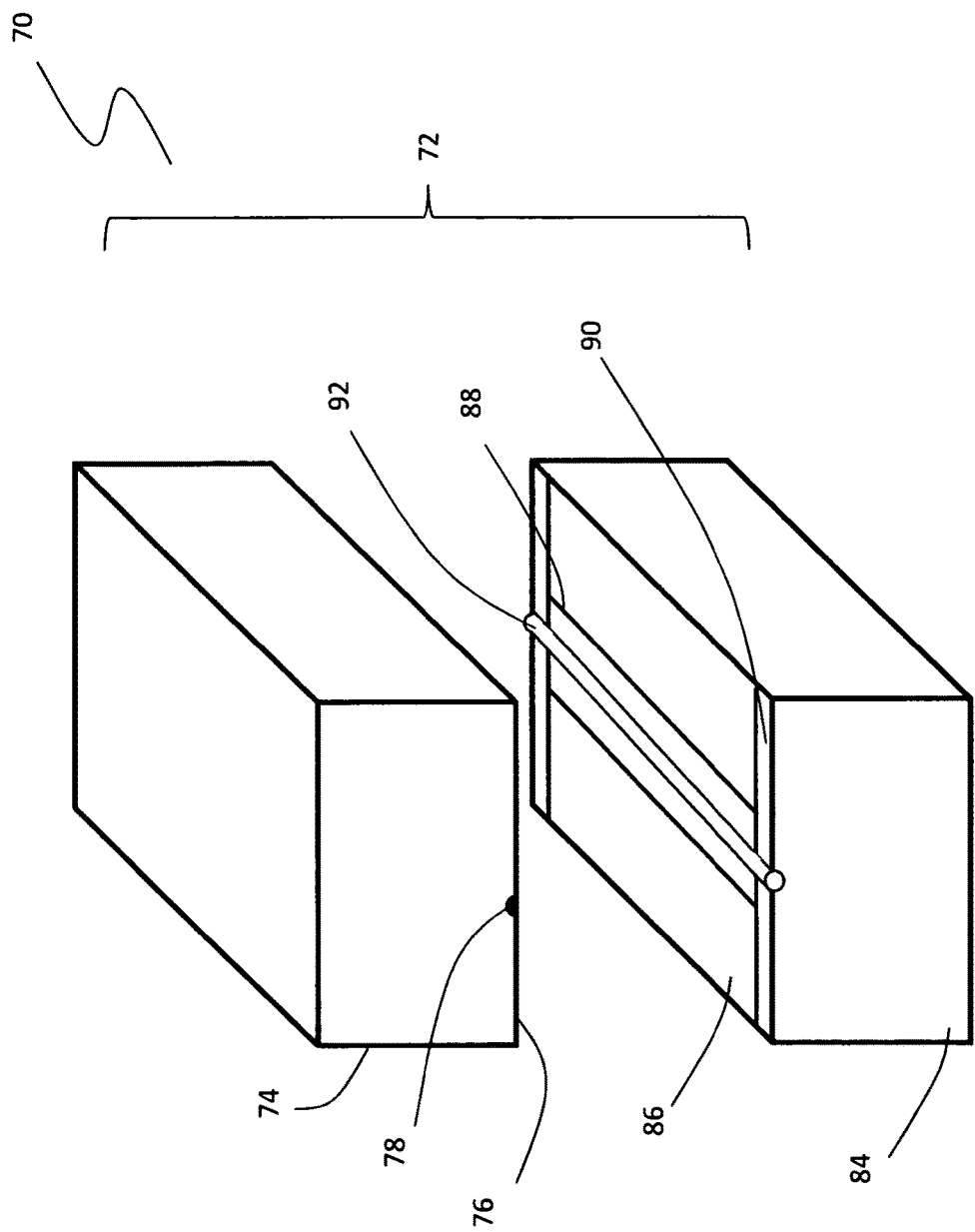
FIG. 5 shows another embodiment of a fiber clamping device used in securely positioning an embodiment of the fiber device disclosed therein.

In the alternative, FIG. 5 shows another embodiment of a fiber clamping device. As shown, the fiber clamping device 70 includes at least one fiber clamp body 72. The fiber clamp body 72 includes a first clamp body 74 having at least one engaging surface 76 including at least one fiber channel 78 therein. In addition, the fiber clamping device 70 includes a second clamp body 84 having at least one engaging surface 86 having at least one fiber engaging channel 88 formed therein. In addition, at least one of the engaging surface 76 formed on the first clamp body 74 and the engaging surface 86 formed on the second clamp body 84 includes at least one material well or reservoir 88 configured to receive one or more thermally conductive fluids therein. Exemplary fluids include liquid metals, gases, fluids, and the like. Optionally, one or more fluid dams 90 may be formed on at least one of the first and second clamp bodies 74, 84 proximate to the material well 88. During use, at least one fiber 92 may be positioned within or proximate to the material well 88 formed in the fiber clamping device 72. Thereafter, one or more clamping forces may be applied to the fiber clamping device 70 to secure the fiber within the fiber clamping device 70.

In one specific embodiment, a doped double-clad optical fiber may be constructed using the manufacturing techniques and materials described above. More specifically, optical fiber 30 may have a core region of Yb doped CALGO having a transverse dimension of about 40 μm encased within a pump cladding region 36 having a thickness of about 10 μm on each side of undoped CALGO, thereby bringing the transverse dimension of the core region 34-pump cladding region 36 to about 60 μm. Thereafter, a second cladding region 38 formed from alumina having a thickness of about 5 μm may be applied to the core region 34-pump cladding region 36 device. The NA of the core region 34 can be optimized by adding a small amount of some additional dopants to the otherwise undoped pump cladding region 36 to nearly match the index of the doped core region 34 and provide a low NA and single mode guidance. The pump cladding region 36 may have an NA of about 0.6 and the cladding to core ratio may be about 1.5. With a Yb doping level of a few percent, the length l required to absorb the pump light will be from about 1 cm to about 5 cm.

In another specific embodiment constructed by the Applicants, a 4 cm long fiber having a core region of about 50 microns diameter, was constructed of 3% Yb:CALGO. Further, the device included an inner cladding of undoped sol-gel CALGO about 10 microns radius and an outer cladding of sol-gel YAG about 3 microns radius. This exemplary fiber was clamped in a Silver foil channel and aluminum heat sink. When used as an optical amplifier, this exemplary device exhibited a gain (continuous wave) of about fifteen times (15× at 1030 nm when pumped with about 47 W at 975 nm).

In another specific embodiment, a 4 cm long fiber having a core region of about 50 microns diameter, was constructed of 1.4% Yb:CALGO, having an inner cladding of undoped sol-gel CALGO of about 10 microns radius and an outer cladding of sol-gel $SiO_2$ of about 3 microns radius. This exemplary fiber device was also clamped in a Silver foil channel and aluminum heat sink. When used as an optical amplifier, the exemplary device exhibited a gain (continuous wave) of about sixteen times (16×) at 1030 nm when pumped with about 34 W at 975 nm.

In another embodiment, the fiber core is not doped and the Raman effect may be used for amplification. The small cladding to core area ratio is particularly desirable for a double-clad Raman laser.

The embodiments disclosed herein are illustrative of the principles of the invention. Other modifications may be employed which are within the scope of the invention. Accordingly, the devices disclosed in the present application are not limited to that precisely as shown and described herein.

What is claimed is:
1. A double-clad crystal fiber, comprising:
a core region manufactured from at least one non-glass material;
a pump cladding region configured to have the core region positioned therein, wherein the pump cladding region is formed from at least one polycrystalline material; and a second cladding region configured to have the core region and pump cladding region positioned therein, wherein the second cladding is formed from at least one polycrystalline material.

2. The device of claim 1 wherein the core region comprises an effectively single mode core.

3. The device of claim 2 wherein the core region has a diameter of 10 μm or more.

4. The device of claim 1 wherein the core region includes at least one doping material selected from the group consisting of Yb, Nd, Er, Pr, Ti, Ho, Tm, and Cr.

5. The device of claim 1 wherein the core material is CALGO, YAG, LuAG, YAlO$_3$, sapphire, LiCAF, LiSAF, and CaF$_2$ and YLF.

6. The device of claim 1 where the core region is manufactured using a laser heated pedestal growth (LHPG) technique.

7. The device of claim 1 wherein the core region is manufactured using a micro-pulling down technique.

8. The device of claim 1 wherein the core region has a high doping level and substantially no photodarkening.

9. The device of claim 1 wherein the pump cladding region is manufactured from at least one material selected from the group selected from CALGO, YAG, LuAG, YAlO$_3$, alumina (sapphire), calcium fluoride, polyimide, silica, LiCAF, LiSAF, spinel, MgO, LiF$_2$, BaF$_2$, MgF$_2$, and YLF.

10. The device of claim 1 wherein the pump cladding region has a numeric aperture of 0.4 or greater.

11. The device of claim 10 wherein the pump cladding region is formed from at least one sol-gel material.

12. The device of claim 1 wherein the pump cladding diameter to core diameter ratio is less than about 2:1, wherein the pump cladding diameter is defined as the core diameter plus two times the pump cladding thickness.

13. The device of claim 1 wherein the double-clad crystal fiber has a thermal conductivity of 1.5 W/m ° K or more.

14. A double-clad crystal fiber, comprising:
a Yb-doped CALGO core region;
a pump cladding region configured to have the core region positioned therein, wherein the pump cladding region is formed from at least one polycrystalline material; and
a second cladding region configured to have the core region and pump cladding region positioned therein, wherein the second cladding region is formed from at least one polycrystalline material.

15. The device of claim 14 wherein the core region comprises an effectively single mode core.

16. The device of claim 14 wherein the core region has a diameter of 10 μm or more.

17. The device of claim 14 wherein the core region has a high doping level and substantially no photodarkening.

18. The device of claim 14 wherein the pump cladding region has a numeric aperture of 0.4 or greater.

19. The device of claim 14 wherein the pump cladding region is manufactured from at least one material selected from the group selected from CALGO, YAG, YAlO$_3$, LuAG, alumina (sapphire), MgO and spinel.

20. The device of claim 19 wherein the pump cladding region is formed from at least one sol-gel material.

* * * * *